United States Patent
Lightman et al.

(10) Patent No.: US 6,757,719 B1
(45) Date of Patent: Jun. 29, 2004

(54) METHOD AND SYSTEM FOR DATA TRANSMISSION BETWEEN WEARABLE DEVICES OR FROM WEARABLE DEVICES TO PORTAL

(75) Inventors: Alexander Lightman, Santa Monica, CA (US); Alex Paul Pentland, Lexington, MA (US); Thad Starner, Atlanta, GA (US); Jackson Jarrell Pair, Santa Monica, CA (US); Kenneth Russell, Sunnyvale, CA (US); Brian L. Jordan, Pittsburgh, PA (US); Russell Eugene Hoffman, Baden, PA (US)

(73) Assignee: Charmed.com, Inc., Beverly Hills, CA (US)

( * ) Notice: Subject to any disclaimer, the term of this patent is extended or adjusted under 35 U.S.C. 154(b) by 0 days.

(21) Appl. No.: 09/561,434

(22) Filed: Apr. 28, 2000

Related U.S. Application Data
(60) Provisional application No. 60/190,837, filed on Mar. 20, 2000, and provisional application No. 60/184,896, filed on Feb. 25, 2000.

(51) Int. Cl.[7] .............................. G06F 13/00; H04B 7/00
(52) U.S. Cl. ...................... 709/219; 709/200; 709/227; 705/74; 707/10; 455/419; 455/517
(58) Field of Search ................................ 709/200, 219, 709/248, 227; 705/74; 455/517, 419; 707/10

(56) References Cited

U.S. PATENT DOCUMENTS

| | | | |
|---|---|---|---|
| 5,262,940 A | 11/1993 | Sussman | |
| 5,383,111 A | 1/1995 | Homma et al. | |
| 5,845,282 A | * 12/1998 | Alley et al. | 709/232 |
| 5,887,063 A | * 3/1999 | Varadharajan et al. | 713/172 |
| 5,921,409 A | 7/1999 | Gerber et al. | |
| 5,930,769 A | 7/1999 | Rose | |
| 5,943,653 A | 8/1999 | Ross et al. | |
| 5,956,658 A | 9/1999 | McMahon | |
| 5,960,085 A | * 9/1999 | de la Huerga | 340/5.61 |
| 6,199,077 B1 | * 3/2001 | Inala et al. | 709/202 |
| 6,272,545 B1 | * 8/2001 | Flanagin et al. | 709/228 |
| 6,292,657 B1 | * 9/2001 | Laursen et al. | 709/219 |
| 6,314,457 B1 | * 11/2001 | Schena et al. | 709/219 |
| 6,324,542 B1 | * 11/2001 | Wright et al. | 707/104.1 |
| 6,330,618 B1 | * 12/2001 | Hawkins et al. | 709/248 |
| 6,336,142 B1 | * 1/2002 | Kato et al. | 709/227 |
| 6,418,326 B1 | 7/2002 | Heinonen et al. | |
| 6,437,301 B1 | 8/2002 | Kitano et al. | |
| 6,446,871 B1 | * 9/2002 | Buckley et al. | 235/472.03 |
| 2001/0055978 A1 | 12/2001 | Herrod et al. | |

OTHER PUBLICATIONS

PalmPilot™ Handbook. 3Com Corporation, 1997. Chapter 10, pp. 141–154.*

* cited by examiner

*Primary Examiner*—David Wiley
*Assistant Examiner*—Alina Boutah
(74) *Attorney, Agent, or Firm*—Beyer Weaver & Thomas, LLP

(57) ABSTRACT

Techniques and approaches that facilitate acquisition, transmission or retrieval of data for wearable devices are disclosed. These wearable devices are electronic devices, such as mobile computing devices or wireless communication devices, and are often small in scale and very portable. Wearable devices are able to communicate with one another to exchange information. Wearable devices are also able to exchange information with a portal server. Personal portals can also be provided for users of the wearable devices so that they can easily access information gather by their wearable device and subsequently transmitted to their personal portal.

27 Claims, 16 Drawing Sheets

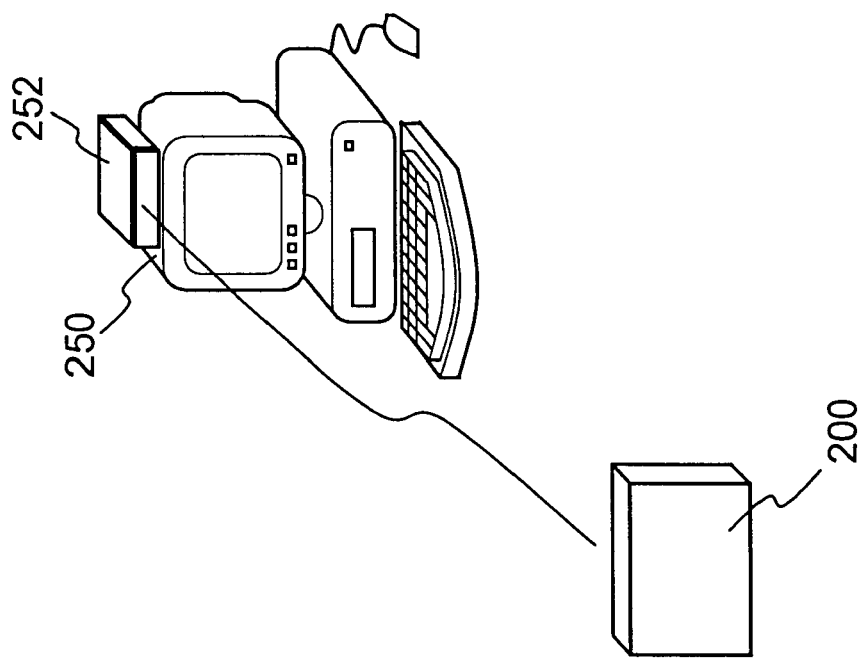

US 6,757,719 B1

METHOD AND SYSTEM FOR DATA TRANSMISSION BETWEEN WEARABLE DEVICES OR FROM WEARABLE DEVICES TO PORTAL

CROSS-REFERENCE TO RELATED APPLICATIONS

This application claims the benefit of: (i) U.S. Provisional Application No. 60/184,896, filed Feb. 25, 2000, by Lightman et al., and entitled "Method and System for Facilitating Use of Wearable Devices", the content of which is hereby incorporated by reference; and (ii) U.S. Provisional Application No. 60/190,837, filed Mar. 20, 2000, by Lightman et al., and entitled "WEARABLE DEVICES", the content of which is hereby incorporated by reference. This application is also related to: (i) U.S. application Ser. No. 09/561,289, filed concurrently herewith, by Lightman et al., and entitled "METHOD AND SYSTEM FOR EVENT INTERACTION MONITORING", the content of which is hereby incorporated by reference; and (ii) U.S. application Ser. No. 09/561,288, filed concurrently herewith, by Lightman et al., and entitled "MARKETING AND PROMOTION OF TECHNOLOGY PRODUCTS USING SHOWS OR EVENTS", the content of which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates to wearable devices and, more particularly, to data transmission with respect to wearable devices.

2. Description of the Related Art

The Internet is a rapidly growing communication network of interconnected computers and computer networks around the world. Together, these millions of connected computers form a vast repository of multimedia information that is readily accessible by any of the connected computers from anywhere at any time. Further, these millions of connected computers provide a reliable means for users to stay in touch from anywhere at any time by way of emails, voices, images or videos. To provide mobility and portability of access to the Internet, mobile communication or computing devices (also known as wireless communication devices) are introduced and capable of communicating, via wireless networks, with the Internet.

The wireless communication devices or mobile computing devices are normally smaller scale computing devices. Examples of such devices include two-way pagers, cellular phones, palm-sized computing devices and personal digital assistant (PDA) apparatuses. These devices enable users to receive, collect, analyze, review and disseminate information as they travel or move about. Although wireless communication devices or mobile computing devices are becoming smaller, they are in many cases still too large to be highly portable or easily wearable. Such devices are also too expensive for many members of the public.

There is therefore a need for wireless communication devices that are smaller, lighter, less expensive, and more wearable.

SUMMARY OF THE INVENTION

Broadly speaking, the invention relates to data acquisition, transmission or retrieval for wearable devices. These wearable devices are electronic devices, such as mobile computing devices or wireless communication devices, and are often small in scale and very portable. Wearable devices are able to communicate with one another to exchange information. Wearable devices are also able to exchange information with a portal server. Personal portals can also be provided for users of the wearable devices so that they can easily access information previously gathered by their wearable device and transmitted to their personal portal.

Wearable devices can take many shapes, designs and forms. As examples, the wearable devices can be provided as badges or charms. Badges are particularly well suited for use for by employees of a business, visitors to a theme park or other tourist area, or attendees to conferences, conventions or trade shows. Charms are small and can double as jewelry, clothing accessories, or fashion items.

The invention can be implemented in numerous ways including, a method, system, device, and a computer readable medium. Several embodiments of the invention are discussed below.

As a method for exchanging data between wearable computing devices, one embodiment of the invention includes at least the acts of: determining whether a first wearable computing device can presently communicate with a second wearable computing device; sending a data exchange request from the first wearable computing device to the second wearable computing device when it is determined that the first wearable computing device can presently communicate with the second wearable computing device, the data exchange request requesting a data exchange between the first wearable computing device and the second wearable computing device; receiving a request response at the first wearable computing device, the request response indicating whether the second wearable computing device has authorized the data exchange; and performing the data exchange between the first wearable computing device and the second wearable computing device when the request response indicates that the second wearable computing device has authorized the data exchange.

As a method for transferring data from a wearable device to a portal server via a server agent, one embodiment of the invention includes the acts of: determining when data should be uploaded from the wearable device to the portal server via the server agent; determining whether the wearable device has permission to access a personal portion of the portal server; and transmitting data from the wearable device to the server agent with instructions for the server agent to forward the data to the personal portion of the portal server when it is determined that the data should be uploaded and it is determined that the wearable device has permission to access the personal portion of the portal server.

As a method for providing personal portals for users of wireless devices, the private portals being hosted by a portal server, one embodiment of the invention includes the acts of: receiving data uploaded from one of the wireless devices to an associated one of the personal portals for the user of the one of the wireless devices; processing the uploaded data to produce processed data; and rendering the processed data available from the associated one of the personal portals.

As a computer readable medium including computer program code for exchanging data between self-wearable computing devices, one embodiment of the invention includes at least: computer program code for determining whether a first self-wearable computing device can presently communicate with a second self-wearable computing device; computer program code for sending a data exchange request from the first self-wearable computing device to the second self-wearable computing device when the computer program code for determining determines that the first self-wearable computing device can presently communicate with the second self-wearable computing device, the data exchange request requesting a data exchange between the first self-wearable computing device and the second self-wearable computing device; computer program code for receiving a request response at the first self-wearable computing device, the request response indicating whether the second self-wearable computing device has authorized the data exchange; and computer program code for performing the data exchange between the first self-wearable computing device and the second self-wearable computing device when the request response indicates that the second self-wearable computing device has authorized the data exchange.

As a computer readable medium including computer program code for transferring data from a wearable device to a portal server via a server agent, one embodiment of the invention includes at least: first computer program code for determining when the data should be uploaded from the wearable device to the portal server via the server agent; second computer program code for determining whether the wearable device has permission to access a personal portion of the portal server; and computer program code for transmitting data from the wearable device to the server agent with instructions for the server agent to forward the data to the personal portion of the portal server when the first computer program code for determining determines that the data should be uploaded and the second computer program code for determining determines that the wearable device has permission to access the personal portion of the portal server.

As a computer readable medium including computer program code for providing personal portals for users of wireless devices, the private portals being hosted by a portal server, one embodiment of the invention includes at least: computer program code for receiving data uploaded from one of the wireless devices to an associated one of the personal portals for the user of the one of the wireless devices; computer program code for processing the uploaded data to produce processed data; and computer program code for rendering the processed data available from the associated one of the personal portals.

The advantages of the invention are numerous. Different embodiments or implementations may yield one or more of the following advantages. One advantage of the invention is that wearable devices can easily acquire from or transmit data to other wearable devices or terminal devices. Another advantage of the invention is that private portals can be provided for users of wearable devices to facilitate retrieval of information previously acquired by the wearable devices and transmitted to the private portals. Still another advantage of the invention is that the wearable devices can take many different configurations, forms, shapes or designs but are generally wearable and light weight.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 2B illustrates a perspective view of a terminal device equipped with a wireless communication apparatus according to one embodiment of the invention;

DETAILED DESCRIPTION OF THE INVENTION

The invention relates to data acquisition, transmission or retrieval for wearable devices. These wearable devices are electronic devices, such as mobile computing devices or wireless communication devices, and are often small in scale and very portable. Wearable devices are able to communicate with one another to exchange information. Wearable devices are also able to exchange information with a portal server. Personal portals can also be provided for users of the wearable devices so that they can easily access information gather by their wearable device and subsequently transmitted to their personal portal.

Wearable devices can take many shapes, designs and forms. As examples, the wearable devices can be provided as badges or charms. Wearable devices are preferable those mobile computing devices or wireless communication devices that can be worn by a user without special equipment such as a case, band or pocket that is wearable. In other words, wearable device are preferably self-wearable. Badges are particularly well suited for use for by employees of a business, visitors to a theme park or other tourist area, or attendees to conferences, conventions or trade shows. Charms are small and can double as jewelry, clothing accessories, or fashion items.

Embodiments of this aspect of the invention are discussed below with reference to FIGS. 1–11B. However, those skilled in the art will readily appreciate that the detailed description given herein with respect to these figures is for explanatory purposes as the invention extends beyond these limited embodiments.

Figure 1:
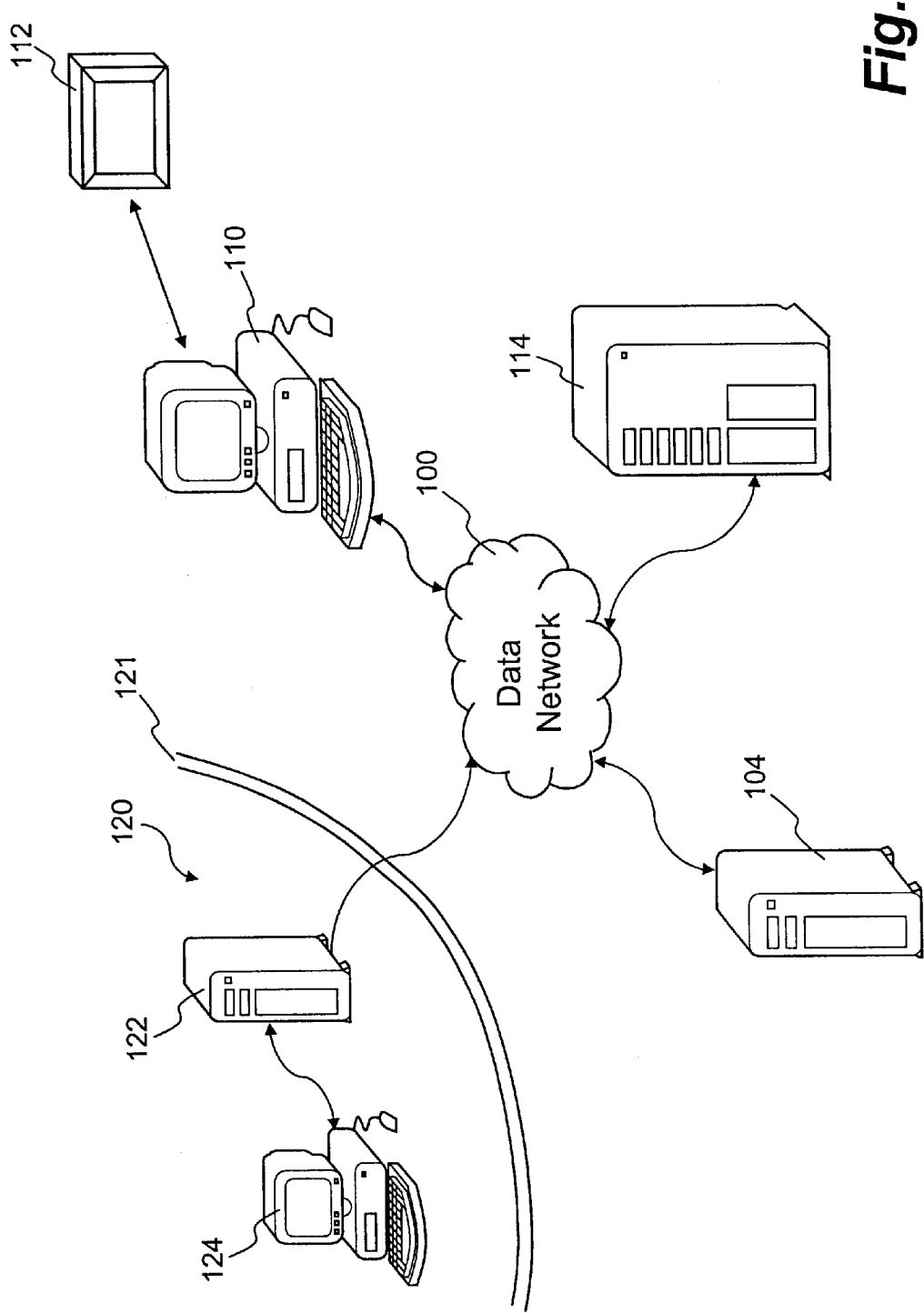
FIG. 1 illustrates a system configuration in which the invention may be practiced.

FIG. 1 illustrates a system configuration in which the invention may be practiced. A data network 100 may be the Internet, an Intranet, or some other public or private data network. A personal computer (PC) 110 and a network server 104 coupled to the network 100. The personal computer 110 represents one of many computing devices that couple to the network 100, and the network server 104 represents one of many application/service servers on the network 100. In one implementation, the personal computer 110 runs a HyperText Markup Language (HTML) browser, such as Netscape Navigator from Netscape Communications Corporation (see www.netscape.com) via the network 100 using HyperText Transfer Protocol (HTTP) to access information stored in the network server 104. The network server 104 is typically operated by a business and identified by an Uniform Resource Identifier (URI) or a domain name, such as www.cnn.com as a news feeding site and www.amazon.com as a super electronic retailer selling from books to consumer electronics. Typically, the information stored in the network server 104 is hypermedia information to facilitate various transactions with the personal computer 110 operated by one or more users.

Also shown in FIG. 1 the system configuration can also include a private network 120 including a computer 124 and a server 122. The private network 120 uses a firewall 121 to protect resources of the private network from users on other networks. The private network 120 is typically used in a confined configuration in which secure information is kept in the server 122 and accessible only by certain limited computing devices (e.g., the computer 124). In one example, the private network 120 is a local area network.

As shown in FIG. 1 is a wearable two-way communication device 112, referred to herein as a wearable device, that is designed to be able to communicate wirelessly with the personal computer 110 or the computer 124. It should be recognized, that although a single wearable device 112 is shown in FIG. 1, the system configuration normally supports a plurality of wearable devices. To facilitate the use of the wearable device 112, a portal server 114 hosts a portal accessible via the data network 100 such as by the personal computer 110 or the computer 124. The portal comprises various kinds of information and data that can be accessed. Additionally, the portal can provide services or applications. For example, the portal can provide an email service to keep the wearable device 112 in touch with other wearable devices. Additional detail on the portal will be provided in detail below.

Figure 2A:
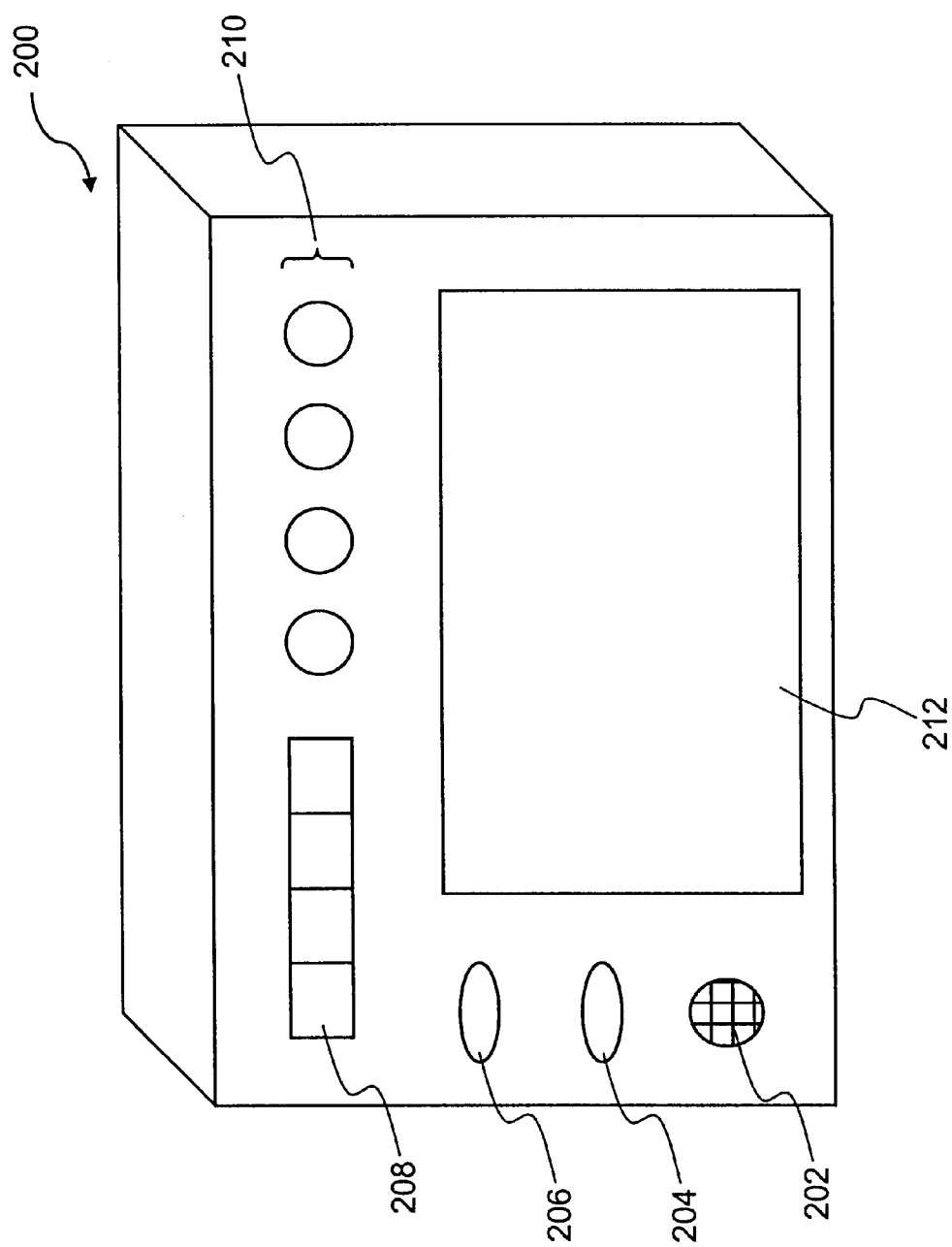
FIG. 2A illustrates an exemplary configuration of wearable device according to one embodiment of the invention.

The wearable device 112 can take many forms, designs or shapes. For example, in one implementation, the wearable device 112 can have a badge-like design, and in another implementation can have a charm like design. The functions or features provided by the wearable device 112 can also vary widely. FIG. 2A illustrates an exemplary configuration of wearable device 112 according to one embodiment of the invention. As shown in FIG. 2A, wearable device 112 is designed like a badge 200. The badge 200 can be attached to a user's clothing or wore by chain around the user's neck. In one implementation, the badge 200 is approximately 2.5 by 3.5 inches. While this particular embodiment implements a wearable device as a badge, it should be recognized that a wearable device could be instantiated in various other forms, shapes and designs (e.g., ring, pendant, or other wearable decorations, apparels or accessories).

Badge 200 incorporates a wireless communication apparatus 202 that permits badge 200 to exchange information with another device, such as a badge or a terminal device. The terminal device may correspond to the personal computer 110 or the computer 124 of FIG. 1 that can be equipped with a corresponding wireless communication apparatus to communicate with the badge 200. In this regard, FIG. 2B illustrates a perspective view of a terminal device 250 equipped with a wireless communication apparatus 252. When a user of the badge 200 walks up to the terminal device 250, data can be exchanged between the badge 200 and the terminal device 250 after initiated by either the badge 200 or the terminal device 250. As will be further described below, the terminal device 250 may be used to allow access to a portal page for the user to interact therewith.

According to one embodiment, the wireless communication apparatus 202 and 252 include at least infrared transmitter and receiver components (not shown) supporting serial infrared communications links with other devices. A variety of infrared communications devices, such as Hewlett Packard's HSDL-1001 transceiver components, may be used to implement the infrared communication apparatus. As another example, Bluetooth technology is used to implement the communication between the devices. Bluetooth is a computing and telecommunications industry specification that describes how small devices such as mobile phones, computers, and personal digital assistants (PDAs) can easily interconnect with each other and with home and business phones and computers using a short-range wireless connection. Alternatively, other communication apparatuses, such as those utilizing acoustic, radio frequency, or electromagnetic coupling, may be used to support the wireless communication apparatus.

As shown in FIG. 2A, the badge 200 can further comprise an audible device 204, a microphone 206, a plurality of indicators 208, and a plurality of activation buttons 210. In addition, badge 200 may include a display 212 such as a Liquid Crystal Display (LCD) or a graphic display. A LCD display provides a visual mechanism for the user to more effectively interact with the badge 200. A graphic display may display images such as a picture of the user along with affiliation information so that the badge 200 resembles an identification (ID) card.

The audible device 204 may be used to produce sound that a user of the badge 200 can hear. In one embodiment, the sound may be generated from a text via a text-to-sound translator. The microphone 206 is typically used for recording when there is a need. For example, when the user needs to record a short conversation, one of the activation buttons may be activated to start the recording. The indicators 208 include a number of LEDs in one embodiment. The LEDs can be used for various purposes. In one embodiment, each of the LEDs is designated to indicate a message. For example, one LED on in green color indicates that the badge 200 is communicating with another device (e.g., another badge or a terminal device). When the LED turns red, that means the communication is done. Depending on an exact implementation, the indicators 208 can be designed for many different purposes. One of the purposes is to have one or more of the indicators "on" when there is a high affinity between two users in communication. In other words, each user stores his/her interest/search criteria in his/her badge, when two badges exchange information therebetween and a match score exceeds a threshold, the users can be notified by one of more of the indicators 208. As the name suggests, the activation buttons 210 provides a mechanism for the user to interact with or control the operation of the badge 200. In a preferred embodiment, the activation buttons 210 are designed to be small in size and the number of activation buttons 210 is less than the number of button in a phone keypad or a computer keyboard.

Further, the wearable device, e.g., badge 200, operates under an operating system, such as Microsoft's Windows CE, Linux, or a distilled version of Linux (referred to herein as Nanix). With the operating system, badge 200 can provide many advantages and benefits over those conventional mobile devices operating that lack an operating system. In one implementation, the operating system is (1) compact, offering high performance in limited memory configurations; (2) scalable, supporting a range of embedded, mobile or multimedia product lines; (3) portable, enabling OEM & customer microprocessor choice; and (4) managed, including integrated power management. Further, the operating system is a 32-bit, multitasking, multithreaded operating system that has an open architecture design, providing support for a variety of devices. The operating system makes possible new categories of products that can 'talk' to each other, share and exchange information, and communicate with a wide variety of enterprise systems or the Internet.

Figure 2C:
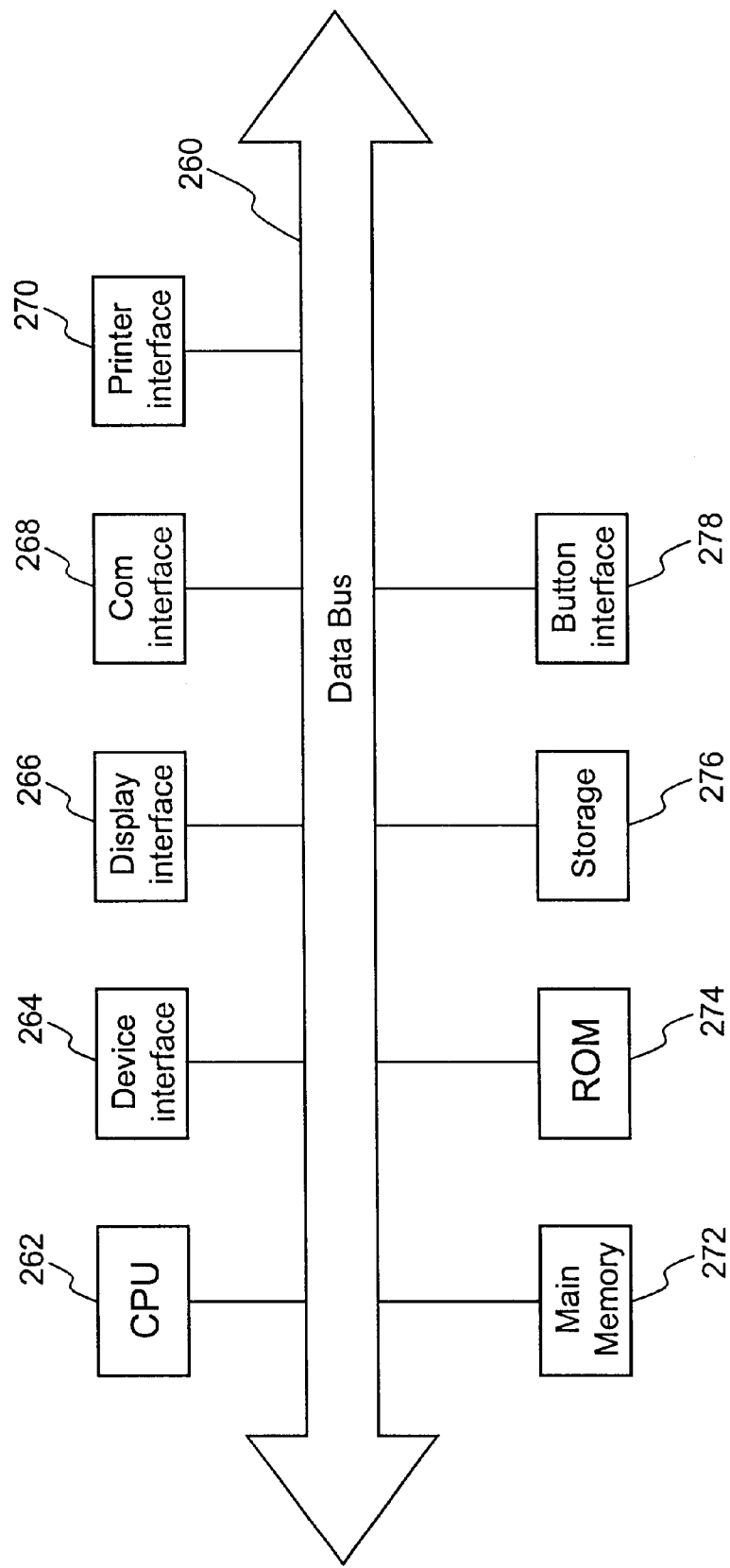
FIG. 2C is a functional block diagram of a wearable device according to one embodiment of the invention.

FIG. 2C is a functional block diagram of a wearable device (e.g., badge 200) according to one embodiment of the invention. The wearable device includes a central processing unit (CPU) 262 interfaced to a data bus 260. The CPU 262 executes certain instructions to manage all parts and interfaces coupled to the data bus 262 for synchronized operations. The device interface 264 may be coupled to an external device such as a personal computer, a terminal device, or a PDA apparatus so that data can be exchanged (uploaded and/or downloaded). Also coupled to the data bus 260 is a display interface 266, a communication interface 268, a printer interface 270, and activation button interface 278.

Main memory 272, such as random access memory (RAM), is also interfaced to data bus 260 to provide CPU 262 with instructions and data. A memory storage 276 is also coupled to the data bus 260 to provide access to other data and instructions. In particular, when executing stored application program instructions, such as the complied and linked version of the operating system or processes associated with the invention, CPU 122 is caused to manipulate the data to achieve desired results. A Read Only Memory (ROM) 274 is provided for storing invariant instruction sequences such as an operating system or a basic input/output operation system (BIOS) for operation of certain aspects of the wearable device.

It should be noted that the block diagram of FIG. 2C pertains to one embodiment of the invention. However, other embodiments of wearable devices (e.g., badges) may employ some of the parts shown in FIG. 2C or may employ additional parts. Hence, the parts and configurations in FIG. 2C shall not be considered as limitations limiting the invention thereto.

Figure 3:
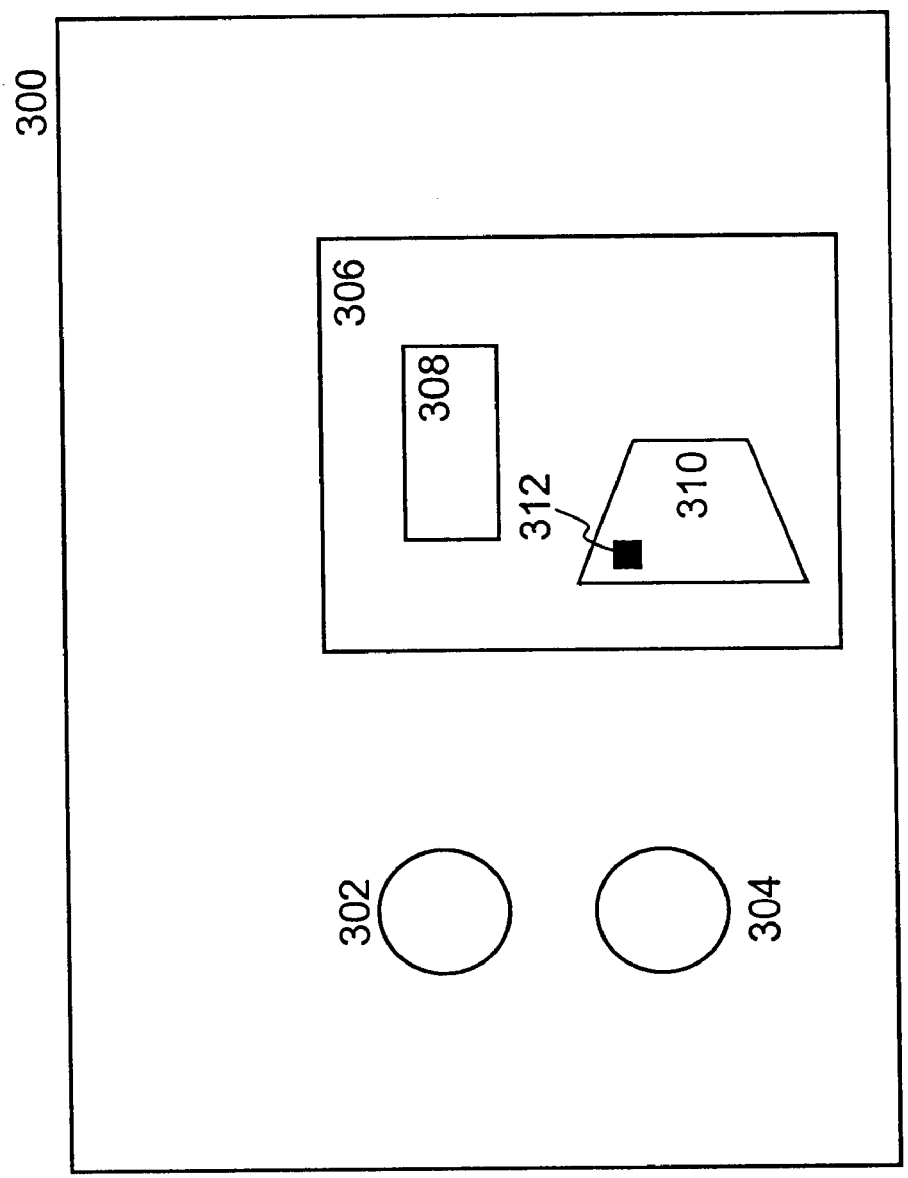
FIG. 3 is a diagram of a representative event portion where attendees can wear wearable devices to exchange information with other attendees as well as booths.

There are various environments that are well suited for use of wearable devices (e.g., badges) to exchange data with other devices. FIG. 3 is a diagram of a representative event portion 300 where attendees can wear wearable devices to acquire and/or exchange information with other attendees as well as booths. The event portion 300 typically represents at least a portion of an event. Examples of events include a convention, a conference, a show or the like. Booths can be provided at the events for promotion of products to the attendees of the event. Hence, the wearable device advantageously allows and promotes information exchange during events.

The representative event portion 300 includes two users 302 and 304, both of which wear wearable devices (e.g., badges). It is assumed that the user 302 is a visitor to a show booth 306 attended by a representative 304. The show booth 306 is provided to promote and demonstrate a product 308. The show booth 306 is also provided with a terminal device 310 that is incorporated with a communications apparatus (i.e., a transceiver) 312.

An example of the operation of the event portion 300 is as follows. Assume that, when attendees to the event register, they are issued wearable devices (e.g., badges). Each of the wearable devices can contain a digital version of a business card or pertinent information of the attendee (user). Namely, the user 302 is issued one of the wearable devices. When the user 302 eventually walks to the show booth 306, the representative 304 typically desires to obtain related information about user 302 particularly when the user 302 appears to be interested in the product 308 or wants to exchange information with the representative 304. Conventionally, the user and the representative would have to search for a business card and then exchange their cards. If either the user or the representative were unable to find their business cards, then conventionally one or both would have to write down related information on a piece of paper. Hence, conventional approaches are not very satisfactory and prone to loss of the information.

The invention offers a much better approach. With the invention, both the users 302 and the representative 304 need to simply activate one of the activation buttons on his/her own wearable device (and be in range for communications). Digital information stored in each wearable device can then be transmitted to the other wearable device. At the end of the day, each user can plug his/her badge into a terminal device (or otherwise communicate with the terminal device) to upload, archive, analyze, disseminate or print out a list of all of the contacts the user has made during the event. As a result, the user no longer needs to bother with a pile of business cards or scraps of paper containing contact information and thus contact information is more easily and reliably acquired. In addition, the invention makes it much simpler for the show booth 306 to collect information about visitors (e.g., user 302) that have come to examine the product 308. The transceiver 312 deployed at the show booth 306 can exchange information with the user 302. For example, the user 302 could initiate the data exchange by activating one of the activation buttons on the wearable device or one badge initiates the data exchange automatically with another one when the badge detects the presence of the another one. The data exchange can, for example, include a release of contact (or profile) information from the wearable device worn by the user 302 to terminal device 310, and/or collection of booth-related information from the terminal device 310 at the show booth 306. The booth-related information can include product information for the product 308, business information for the business operating the show booth, or event information (schedules, topics, announcements).

Portals, or Internet portals, are World Wide Web (WWW) sites that is or proposes to be major starting sites for users when they connect to the Internet or that users tend to visit as anchor or resource sites. In view of utilities and conveniences provided by portals, it is desired that portals support interactive two-way communication devices so that users of the devices can be constantly provided a communication channel with others in addition to receiving personalized information, content or services from others (or the operator of the portal).

A portal can be specifically designed for use with wearable devices (e.g., badges) and hosted in a server coupled to a data network (e.g. 100 of FIG. 1). The portal is a hub for the user community and a mechanism in which badge enabled individuals can interact with each other and with partner vendors, suppliers and sponsors. The portal is developed to provide the unique experience of connecting badge enabled users from anywhere at any time. The server may be operated by an event sponsor or a business entity and facilitates the use of the badges. Any terminal devices that are coupled to the data network may be used to retrieve data in the portal. The terminal device can, for example, be the computer 110 or 124 of FIG. 1 or the terminal device 310 of FIG. 3.

According to one aspect of the invention, badge enabled users have access to each other and all vendors that they met at a particular event. Vendors are also able to know what users have visited their booths, and the profiles of these users. Further, users have the ability to share who they came in contact with, for how long they spoke with them, and how to reach these people via their e-mail addresses if the person or persons that they are speaking with care to share their information through use of wireless communications provided with the badges. Specifically, the badges record information and interface with the portal to provide information on the interactions that people have with other badge wearers as well as the vendors that they have come in contact with.

Figure 4A:
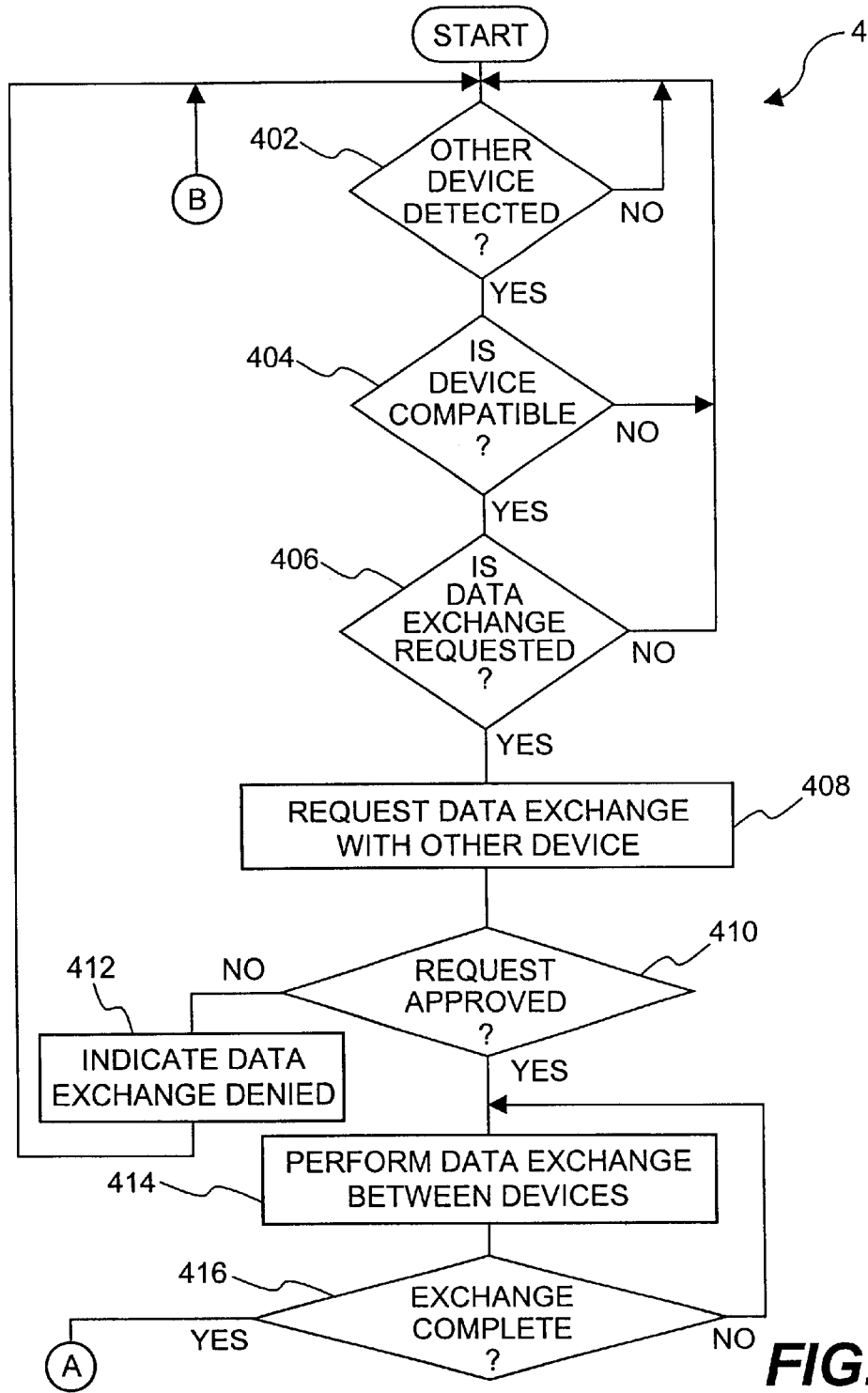
FIGS. 4A and 4B are flow diagrams of data exchange processing according to one embodiment of the invention.
Figure 4B:
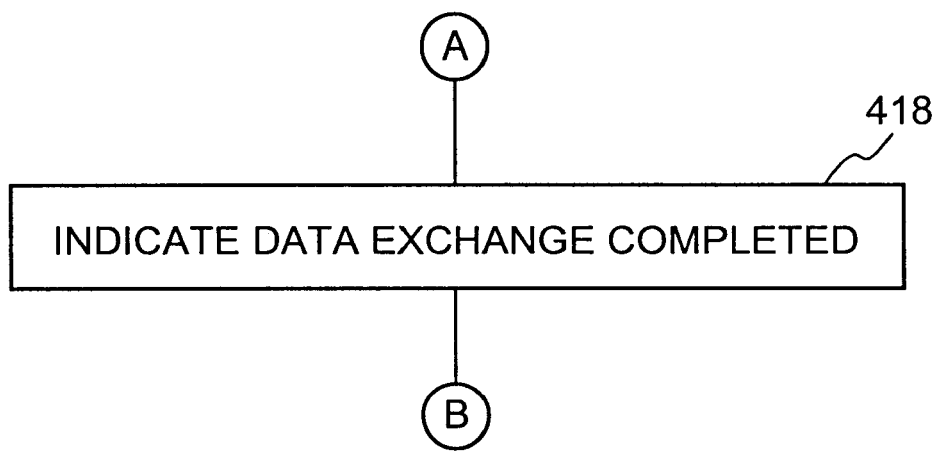

FIGS. 4A and 4B are flow diagrams of data exchange processing 400 according to one embodiment of the invention. The data exchange processing 400 is, for example, performed by a wearable device, such as the wearable device 112 discussed above. The data exchange processing 400 can be operational whenever the wearable device is operational or can be activated under user control.

The data exchange processing 400 begins with a decision 402 that determines whether other wearable devices are detected. When the decision 402 determines that no other devices are detected, the data exchange processing 400 awaits detection of other devices. In one implementation, the wearable devices can search for other wearable devices or terminal devices. Typically, these other wearable devices or terminal devices would need to come within a range of the wearable device. For example, the wearable devices can use infrared energy to communicate with the other wearable devices or terminal devices that come within its limited range. Since infrared energy primarily uses line of sight to communicate, in order for the wearable device to communicate with the other wearable devices or terminal devices they must be in-sight of each other. Alternatively, the devices could communicate using radio waves.

Once the decision 402 determines that another wearable device has been detected, a decision 404 determines whether the detected device is compatible. In one implementation, the detected device is compatible when the detected device is of the same type or designed for intercommunication. However, when the detected device is a foreign device unknown to the wearable device, it is deemed incompatible. In any case, when the decision 404 determines that the detected device is not compatible, the data exchange processing 400 returns to the decision 402 to restart the data exchange processing 400.

On the other hand, when the decision 404 determines that the detected device is compatible, then a decision 406 determines whether data exchange has been requested. The data exchange can be requested either automatically or in a manual manner. As an example, the wearable device can automatically search for other devices and initiate data exchange once other compatible devices are found. On the other hand, the data exchange could be initiated by a user action such as depressing a button on the wearable device. In any case, when the decision 406 determines the data exchange has not been requested, the processing returns to the decision 402 to restart the data exchange processing 400. It should be recognized that the ordering of the decisions 402 and 406 could be switched so that searching for other devices is not performed until data exchange is requested.

Alternatively, when the decision 406 determines that data exchange has been requested, data exchange is requested 408 with the other device that has been detected. The other device is either another wearable device or a terminal device. Next, a decision 410 determines whether the request for data exchange has been approved by the other device. The other device can approve or disapprove of the requested data exchange in a variety of ways. For example, the other device can be configured to operate such that they approve of all requests, approve of requests fitting certain criteria, or require manual approval of the request. When the decision 410 determines that the other device has denied the data exchange, then the device indicates 412 that data exchange has been denied. The indication 412 can be an audio sound to the individual wearing the wearable device, or can be a displayed symbol, image or text on the display screen of the wearable device. Following block 412, the data exchange processing 400 returns to repeat the decision 402 and subsequent blocks so that additional data exchange requests can be processed.

On the other hand, when the decision 410 determines that the requested data exchange is approved, then the data exchange is performed 414 between the devices. A decision 416 then determines whether the data exchange has completed. When the decision 416 determines that the data exchange has not completed, the data exchange processing 400 returns to repeat the operation 414. It should be noted that the data exchange can be performed until successful or a time-out occurs. When the decision 416 determines that the data exchange has completed, then the wearable device indicates 418 that the data exchange has been completed. As an example, the indication 418 can be an audio sound, or can be a displayed symbol, image or text on the display screen of the wearable device. After the indication 418 is provided, the data exchange processing 400 returns to repeat the decision 402 and subsequent operations so that additional data exchange requests can be processed.

Hence, according to the data exchange processing 400 data can be exchanged between wearable devices when they are able to communicate with one another. The communication technique preferably utilized between the pair of wearable devices is a communication technique based on light energy. One example of a communication technique based on light energy is infrared communications. Often, such techniques are referred to as in-sight communication techniques. Further, the type of data being exchanged is normally dependent upon the type of application in which the wearable devices are utilized. In one example, the data being exchanged pertains to profiles of the users that wear the wearable devices. Hence, the data exchange processing 400 can serve to exchange profile information associated with the wearers of the wearable devices. For example, the profile information can include name, business and contact information. In addition, the wearable devices themselves may be able to acquire certain data during their operation. For example, the wearable devices may include an audio and/or video recording mechanism and, if so, such data could also be exchanged between the wearable devices. As another example, the wearable devices may also monitor or produce information on how long users of wearable devices interacted (e.g., conversation) with one another. Still further, the wearable devices can exchange information with other devices (besides wearable devices), such as terminal devices or personal computers.

Besides the direct exchange of information between devices, namely, wearable devices, the devices can also communicate with a server. In one embodiment, the server is referred to as a portal server. The portal server operates as a portal in which users of various devices are able to access the portal content or services via a data network, such as the Internet. The portal server is a port of information that can be accessed by the devices. For example, the portal can be provided on the portal server 114 and accessed by computers 110, 124 shown in FIG. 1.

Figure 5A:
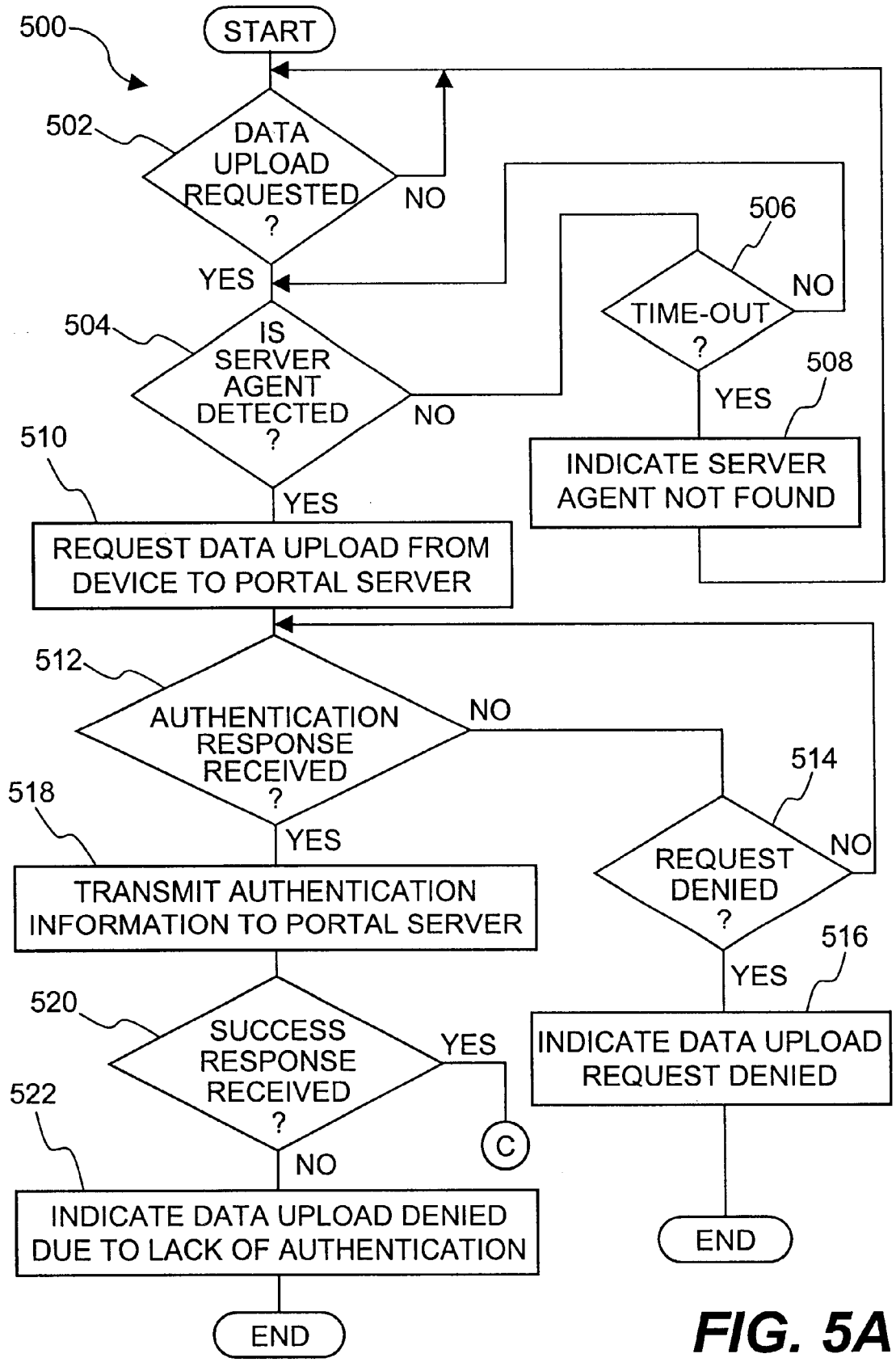
FIGS. 5A and 5B are flow diagrams of data upload processing according to one embodiment of the invention.
Figure 5B:
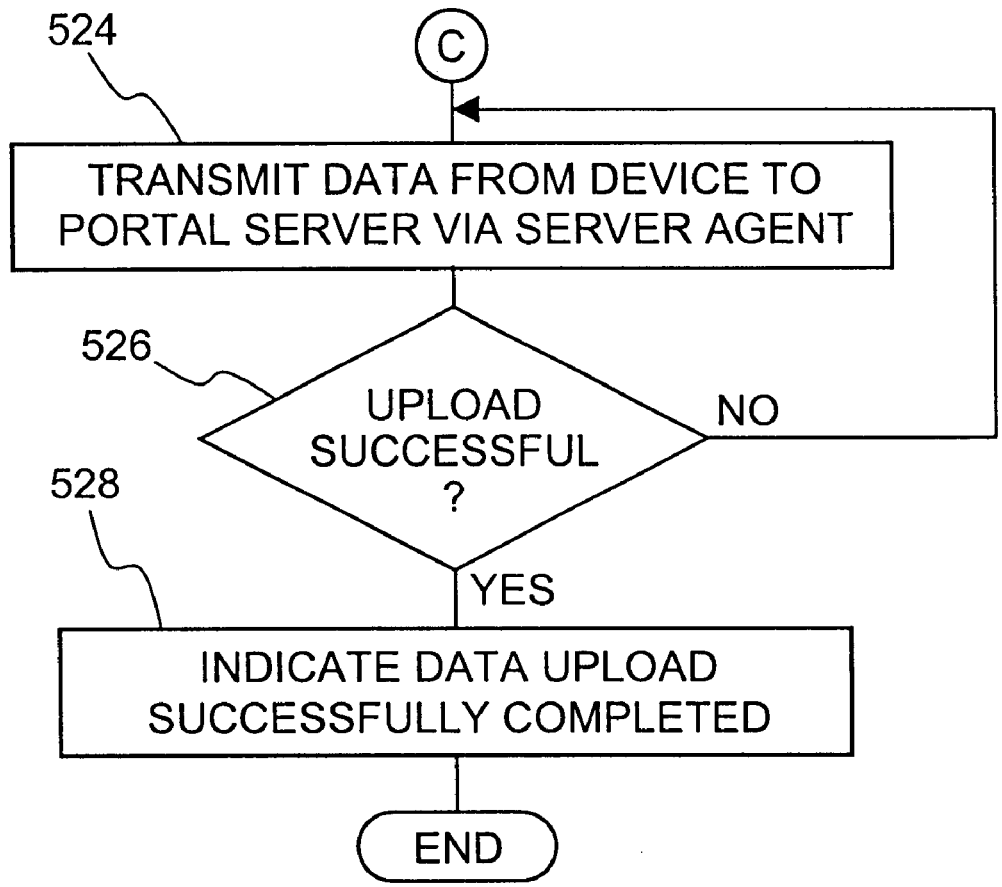

FIGS. 5A and 5B are flow diagrams of data upload processing according to one embodiment of the invention. The data upload processing 500 is, for example, performed by a device (e.g., wearable device or client device). In general, the data upload processing 500 serves to upload data from the device to the portal server. In one implementation, the data is uploaded from the device to a server agent (e.g., terminal device) proximate to the device, and then uploaded from the server agent to the portal server. In such an implementation, the server agent can be considered as a gateway to the portal server.

The data upload processing 500 begins with a decision 502 that determines whether data upload has been requested. Typically, the user of the device will request data upload by depressing a button or making a menu selection. Alternatively, the data upload could be automatically triggered by the device such as when the amount of data stored at the device exceeds a threshold limit or when a terminal device is detected.

When the decision 502 determines that data upload is not yet requested, then the data upload processing 500 essentially awaits for data upload to be requested. Once the decision 504 determines the data upload has been requested, a decision 502 determines whether a server agent has been detected. A server agent is an agent for the portal server or an agent for the device, and serves to act as an intermediary between the device and the portal server. When the decision 504 determines that a server agent is not detected, then a decision 506 determines whether a time-out has occurred. When the decision 506 determines that the time-out has not occurred, then the data upload processing 500 returns to repeat the decision 504 and subsequent operations so as to continue to attempt to detect the server agent. Alternatively, when the decision 506 determines that a time-out has occurred, then the device indicates 508 that the server agent is not found. As an example, the indication 508 can be an audio sound or can be a displayed symbol, image or text on the display screen of the device. Following the operation 508, the data upload processing 500 returns to repeat the decision 502 and subsequent operations so that additional data upload requests can be processed.

Once the decision 504 determines that a server agent has been detected, the data to be upload from the device to the portal server is requested 510. Here, the data from the particular device is to be uploaded to the portal server. However, the portal server serves to manage data that is private to a plurality of devices. Hence, the data upload from the device to the portal server needs to store the data being uploaded to a private portion within the portal server that is associated with the user of the device. In this regard, a decision 512 determines whether an authentication response has been received from the portal server. Here, the data upload processing 500 is awaiting an authentication response from the portal server. When the decision 512 determines that the authentication response is not received, then a decision 514 determines whether the request for data upload has been denied. When the decision 514 determines that the request for data upload has not been denied, then the data upload processing 500 returns to repeat the decision 512 and subsequent operations. Alternatively, when the decision 514 determines that the request for data upload has been denied, then it is indicated 516 that the data upload request has been denied. As an example, the indication 516 can be an audio sound or can be a displayed symbol, image or text on the display screen of the device. After the device indicates 516 that the data upload request has been denied, then the data upload processing 500 is complete and ends.

On the other hand, when the decision 512 determines that an authentication response has been received, then the portal server has recognized that there is a request for a data upload and now requests that the device (or its user) authenticate itself to the portal server. Hence, authentication information is transmitted 518 to the portal server. Such authentication could alternatively be performed with respect to the server agent. Next, a decision 520 determines whether a success response has been received. Here, the success response indicates whether the portal server has received the authentication information and has been able to authenticate the device (or its user) to access the portal server to carry out the data upload. Hence, when the decision 520 determines that the success response is not received, then the device indicates 522 that the data upload has been denied due to a lack of authentication. As an example, the indication 522 can be an audio sound or can be a displayed symbol, image or text on the display screen of the device. Following the indication 522, the data upload processing 500 is complete and ends.

On the other hand, when the decision 520 determines that a success response has been received, then the data upload can be performed. Accordingly, data from the device is transmitted 524 to the portal server (via the server agent). Then, a decision 526 determines whether the data upload has been successful. When the decision 526 determines that the data upload has not yet been successful, then the data upload processing 500 returns to repeat the operation 524 so that the data transmission can continue and/or the data can be retransmitted. Once the decision 526 determines that the data upload has been successful, the device indicates 528 that the data upload has successfully completed. As an example, the indication 528 can be an audio sound or can be a displayed symbol, image or text on the display screen of the device. Thereafter, the data upload processing 500 is complete and ends.

Figure 6:
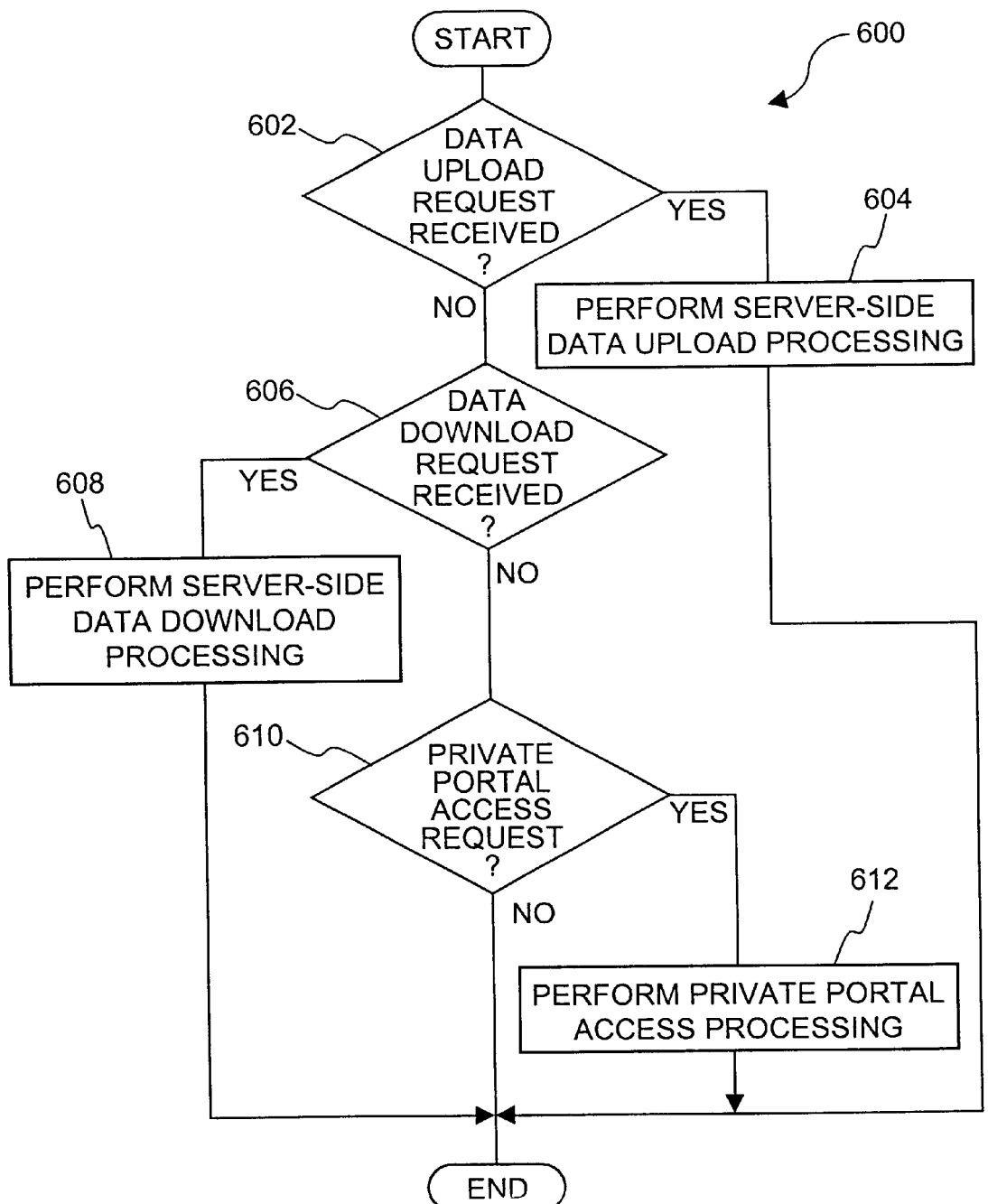
FIG. 6 is a flow diagram of data upload/download processing according to one embodiment of the invention.

FIG. 6 is a flow diagram of data upload/download processing 600 according to one embodiment of the invention. The data upload/download processing 600 is, for example, performed by a portal server. Typically, the data upload/download processing 600 begins when an incoming request is received.

The data upload/download processing 600 begins with a decision 602 that determines whether a data upload request has been received. When the decision 602 determines that a data upload request has been received, server-side data upload processing is performed 604. The details on the server-side data upload processing are described below with respect to FIG. 7.

On the other hand, when the decision 602 determines that the incoming request is not a data upload request, then a decision 606 determines whether a data download request has been received. When the decision 606 determines that a data download request has been received, server-side data download processing is performed 608. The server-side data download processing is described in detail below with respect to FIG. 8. Alternatively, when the decision 606 determines that the request is not a data download request, then a decision 610 determines whether the request is a private portal access request. When the decision 610 determines that the request is a private portal access request, private portal access processing is performed 612. The private portal access processing is described in detail below with respect to FIG. 10. Following the decision 610 when the incoming request is also not a private portal access request, as well as following the operations 604, 608 and 612, the data upload/download processing 600 is complete and ends. The data upload/download processing 600 is repeated each time a request is received at the portal server.

Figure 7:
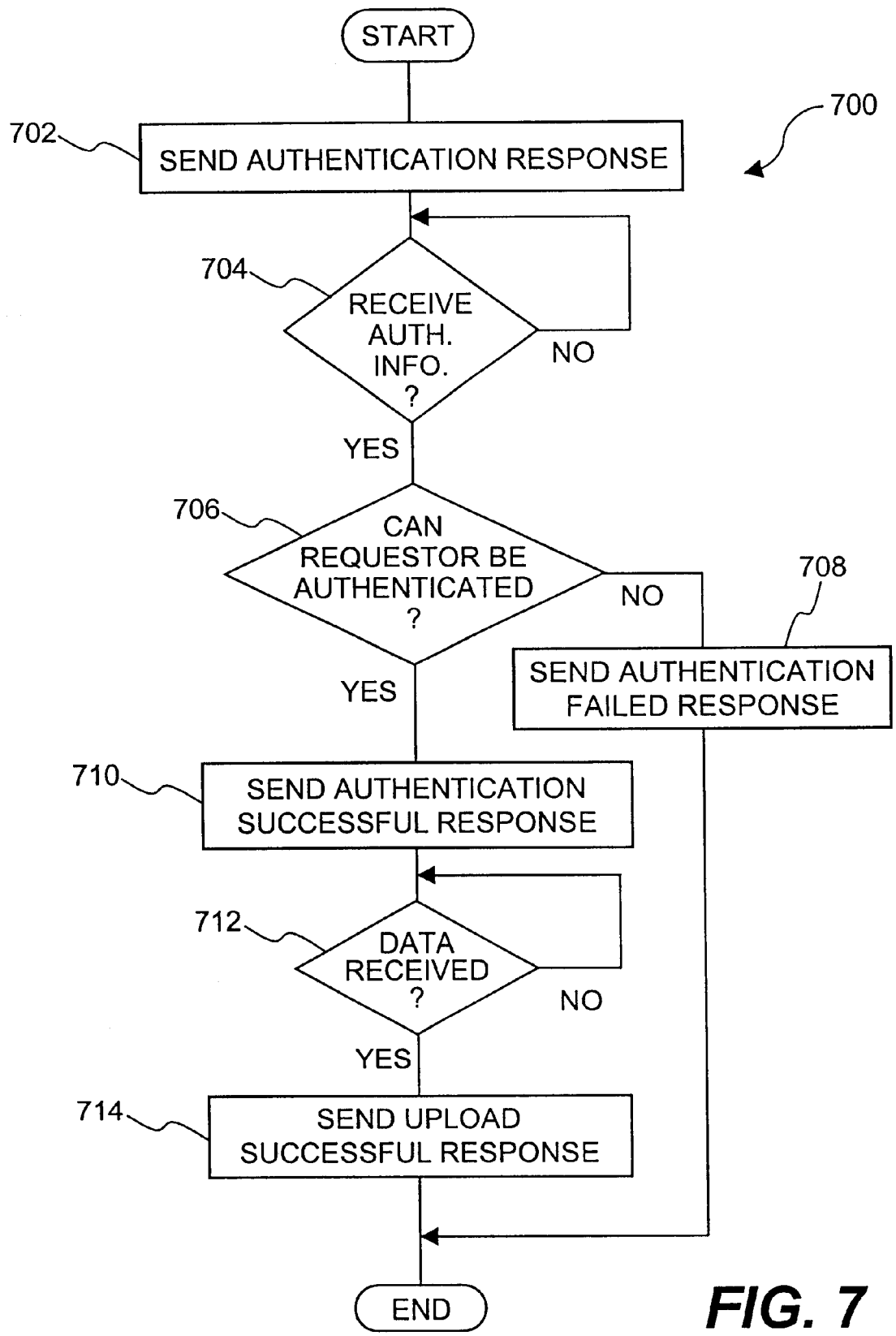
FIG. 7 is a flow diagram of server-side data upload processing according to one embodiment of the invention.

FIG. 7 is a flow diagram of server-side data upload processing 700 according to one embodiment of the invention. The server-side data upload processing 700 represents one embodiment of the server-side data upload processing referenced at operation 604 in FIG. 6. The server-side data upload processing 700 is performed at a server, namely, a portal server. In one implementation, data is uploaded from a particular device to the portal server through a server agent.

The server-side data upload processing 700 begins upon receiving a data upload request at the portal server. The data upload request is sent by a requesting device. In response to the data upload request, an authentication response is sent 702 to the requesting device. Then, a decision 704 determines whether authorization information has been received. The decision 704 determines whether the requesting device has transmitted authorization information to the portal server. When the decision 704 determines that the authorization information has not yet been received, the server-side data upload processing 700 awaits the receipt of the authorization information. Once the decision 704 determines that the authorization information has been received, a decision 706 determines whether the requester (user of the requesting device) can be authenticated. Here, the portal server operates to examine the authentication information to determine whether the requestor (or requesting device) can be authenticated. When the decision 706 determines that the requestor cannot be authenticated, an authentication failed response is sent 708 to the requesting device. Following the operation 708, the server-side data upload processing 700 is complete and ends without having performed any data upload.

On the other hand, when the decision 706 determines that the requester can be authenticated, an authentication successful response is sent 710 to the requesting device. The authentication successful response informs the requesting device that the server has authenticated the requesting device and thus the data upload processing can be performed. Hence, after the authentication successful response is sent 710, the server-side data upload processing 700 awaits the receipt of the data being uploaded. A decision 712 determines whether the uploaded data has been received. When the decision 712 determines that the uploaded data has not yet been received, the server side data upload processing 700 awaits the receipt of the data. When the decision 712 determines that the uploaded data has been received, an uploaded successful response is sent 714 to the requesting device. Following the operation 714, the server-side data upload processing 700 is complete and ends. The decisions 704 and 712 can also terminate the server-side data upload processing 700 early if the decisions 704 and 712 wait beyond a time-out condition.

Figure 8:
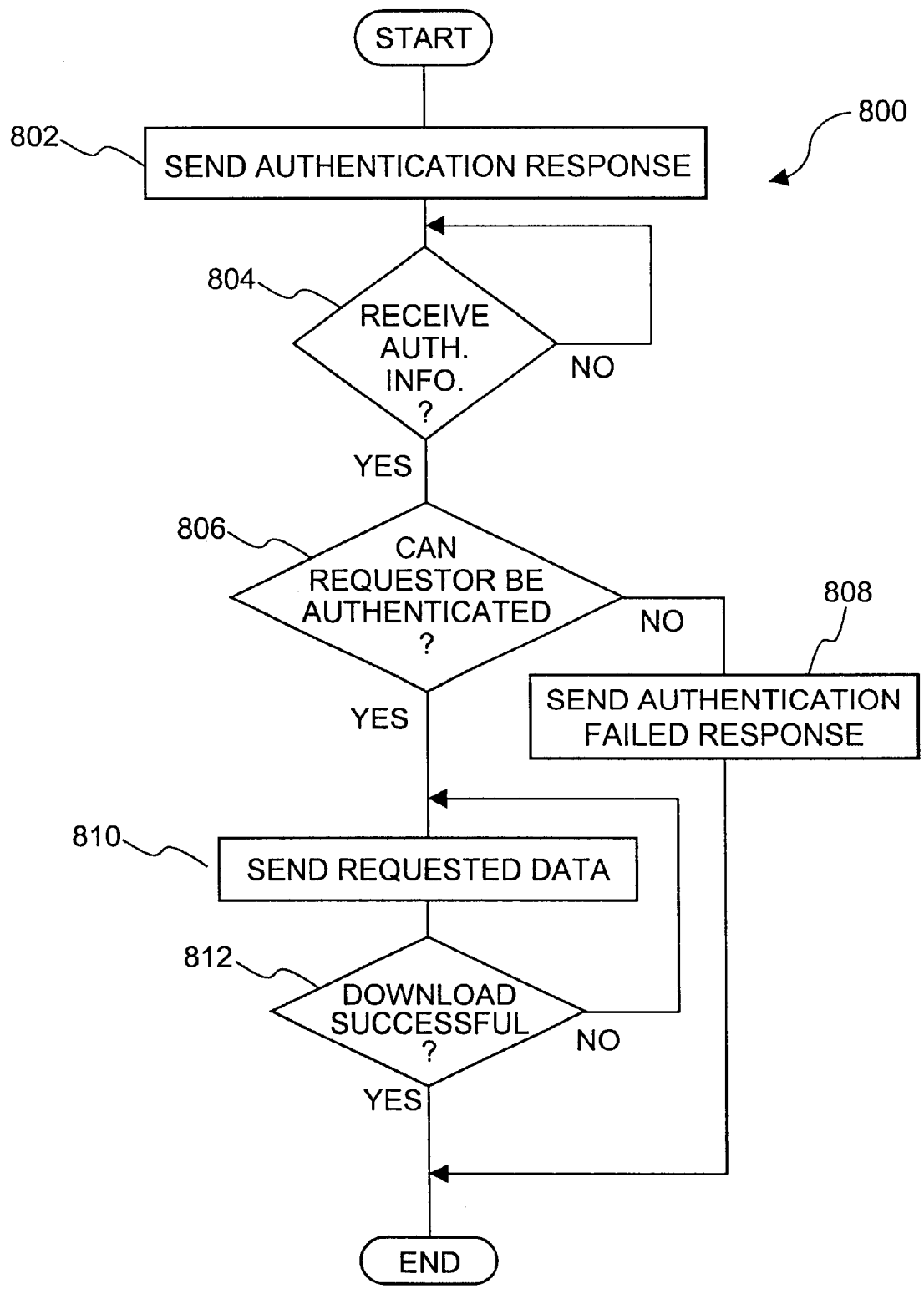
FIG. 8 is a flow diagram of server-side data download processing according to one embodiment of the invention.

FIG. 8 is a flow diagram of server-side data download processing 800 according to one embodiment of the invention. The server-side data download processing 800 is, for example, performed by a portal server to download data from the portal server to a particular device. In one implementation, data is downloaded from the portal server to a particular device through a server agent.

The server-side data download processing 800 initially begins when a data download request has been received and detected. Once the data download request has been received, an authentication response is sent 802 to the requesting device. A decision 804 then determines whether authorization information has been received from the requesting device. When the decision 804 determines that authorization information has not been received from the requesting device, then the server-side data download processing 800 awaits the receipt of the authorization information. Once the decision 804 determines that the authorization information has been received, a decision 806 determines whether the requestor (user of the requesting device) can be authenticated. When the decision 806 determines that the requester cannot be authenticated, then an authentication failed response is sent 808 to the requesting device. Thereafter, the server-side data download processing 800 is complete and ends without ever performing any downloading of data.

On the other hand, when the decision 806 determines that the requester can be authenticated, the requested data is sent 810 to the requesting device. A decision 812 then determines whether the download has been successful. When the decision 812 determines that the download has not been successful, the server-side data download processing 800 returns to repeat the operation 810 and subsequent operations so that the requested data can continue to be sent or can be resent. Once the decision 812 determines that the download of the data has been successful, the server-side data download processing 800 is complete and ends. The decisions 804 and 812 can also terminate the server-side data download processing 800 early if the decisions 804 and 812 wait beyond a time-out condition.

Figure 9:
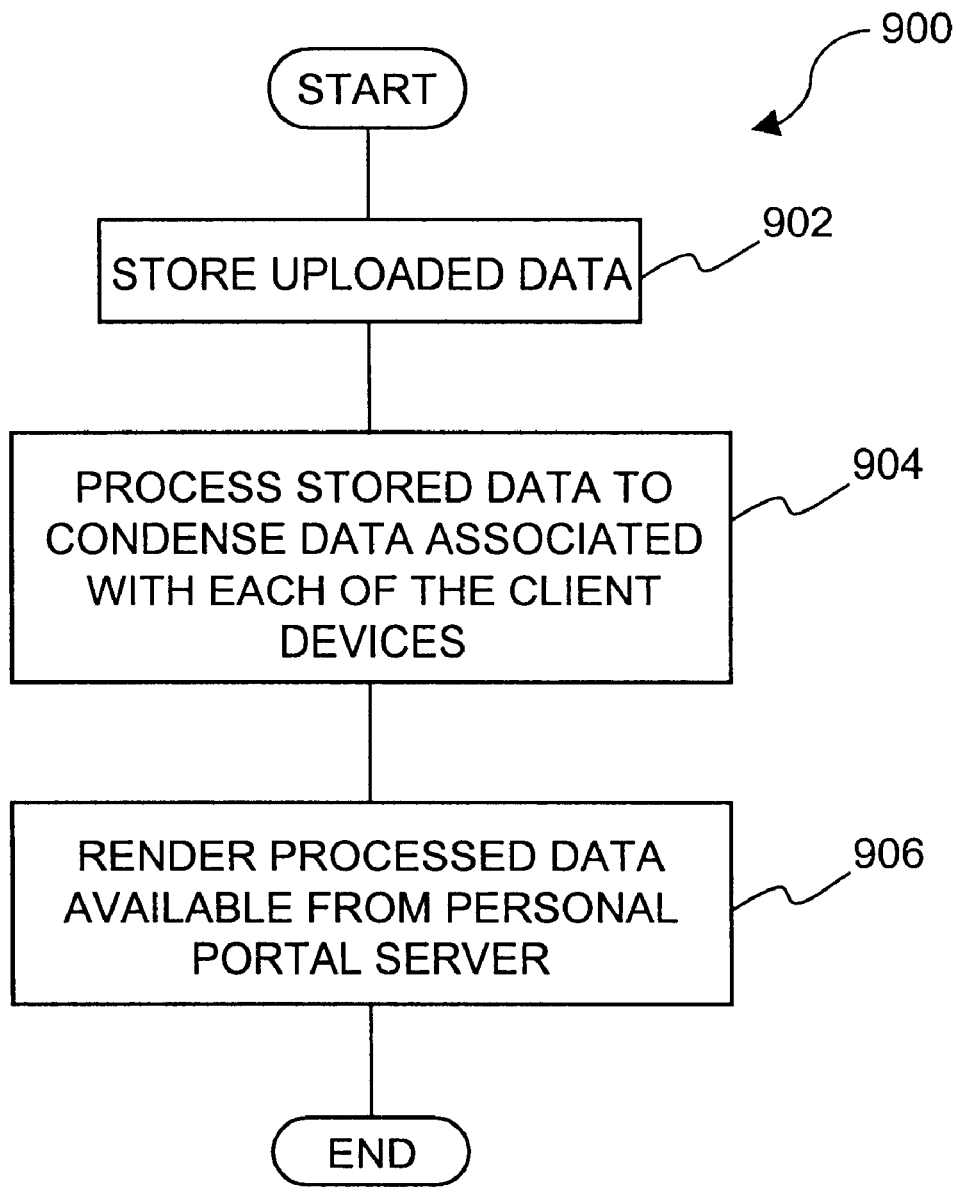
FIG. 9 is a flow diagram of server-side data management processing according to one embodiment of the invention.

FIG. 9 is a flow diagram of server-side data management processing 900 according to one embodiment of the invention. The server-side data management processing 900 is, for example, performed by a portal server to processing data that has been uploaded to the portal server by various devices (e.g., wearable devices or client devices).

Initially, upon receiving the uploaded data at the portal server, the uploaded data is stored 902. Thereafter, the stored data can be processed 904 to condense the stored data associated with each of the client devices or a respective user thereof. The processing 904 is thus able to produce a report or list from the stored data. As an example, in the case where the client device is used in a conference setting to gather contact information from other participants and information/presentation booths that a particular client device has interacted with during the conference. In such a case, the processing 904 can produce a report or list of contacts and their profile information from the conference, and/or a report or a list of information/presentation booths and their marketing or contact information. The processing 904 can begin upon receiving or storing the uploaded data or can be periodically performed. After the processing 904, the processed data is rendered 906 available from a personal portal server. Following the rendering 906, the server-side data management processing 900 is complete and ends. Since the server is coupled to a data network (i.e. the Internet) in a preferred embodiment, the data in the server can be accessed from other devices, such as a desktop computer and a laptop computer, coupled to the same data network. In one example, a badge user can log, from anywhere at anytime, onto the server to look up for pertinent information of a particular contact. In another example, a badge user can log onto the server and send an email to one of the contacts provided in the data.

The private portal access processing is performed when a user desires to access his/her private portal where they can retrieve, modify or add data.

Figure 10:
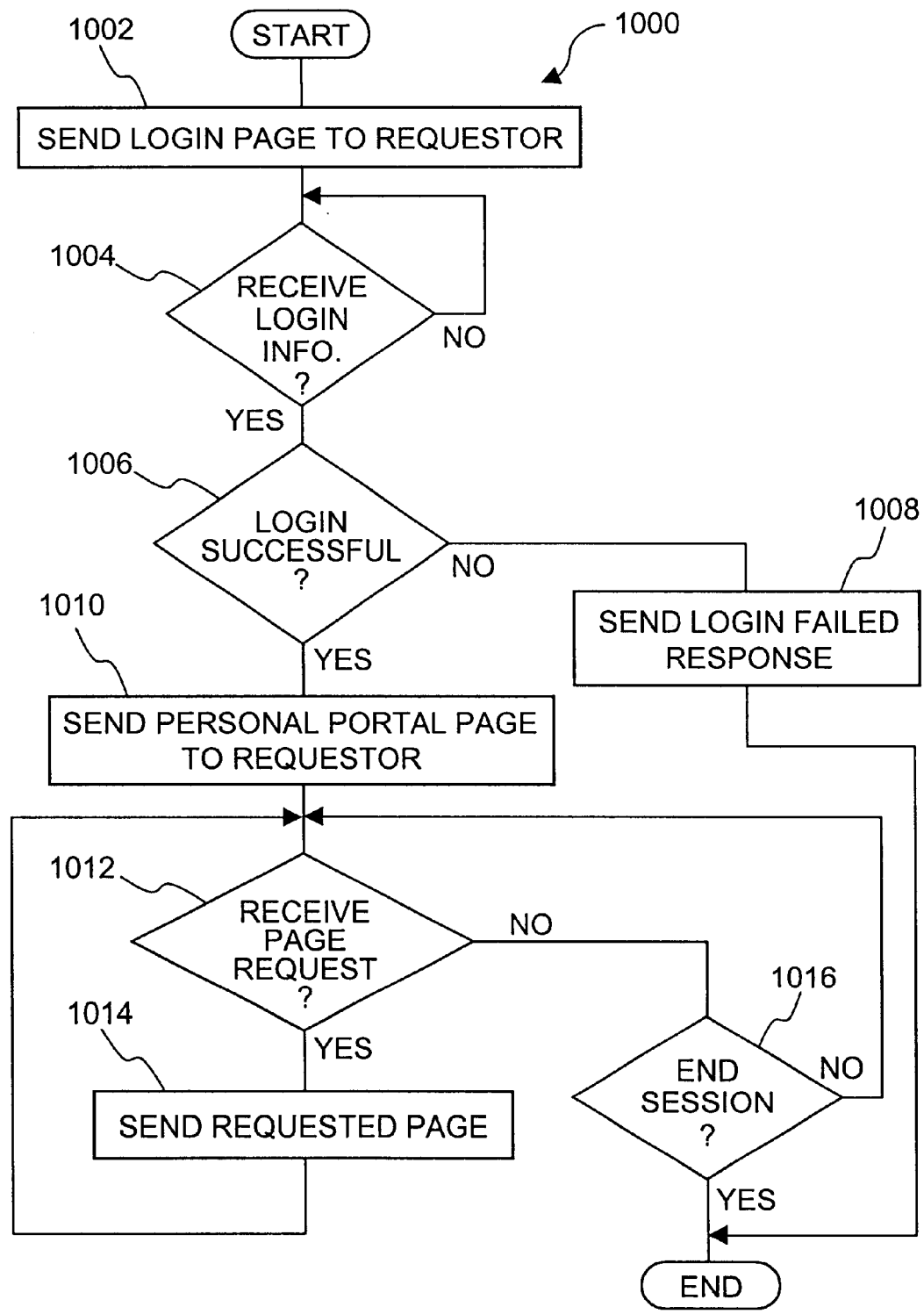
FIG. 10 is a flow diagram of private portal access processing according to one embodiment of the invention.

FIG. 10 is a flow diagram of private portal access processing 1000 according to one embodiment of the invention. The private portal access processing 1000 is, for example, performed by a portal server when users attempt to access their private portals. The private portal access processing 1000 represents one embodiment of the private portal access processing performed at operation 612 of FIG. 6.

The private portal access processing 1000 initially sends 1002 a login page to the requestor. Here, when a requester attempts to access the login page of the portal server, the login page is sent 1002 to the requester. Then, a decision 1004 determines whether login information has been received. The login information will be received from the requestor in response to the user completing the login page which is typically a form (e.g., HTML form). When the decision 1004 determines that the login information has not yet been received, the private portal access processing 1000 awaits the receipt of the login information.

Figure 11A:
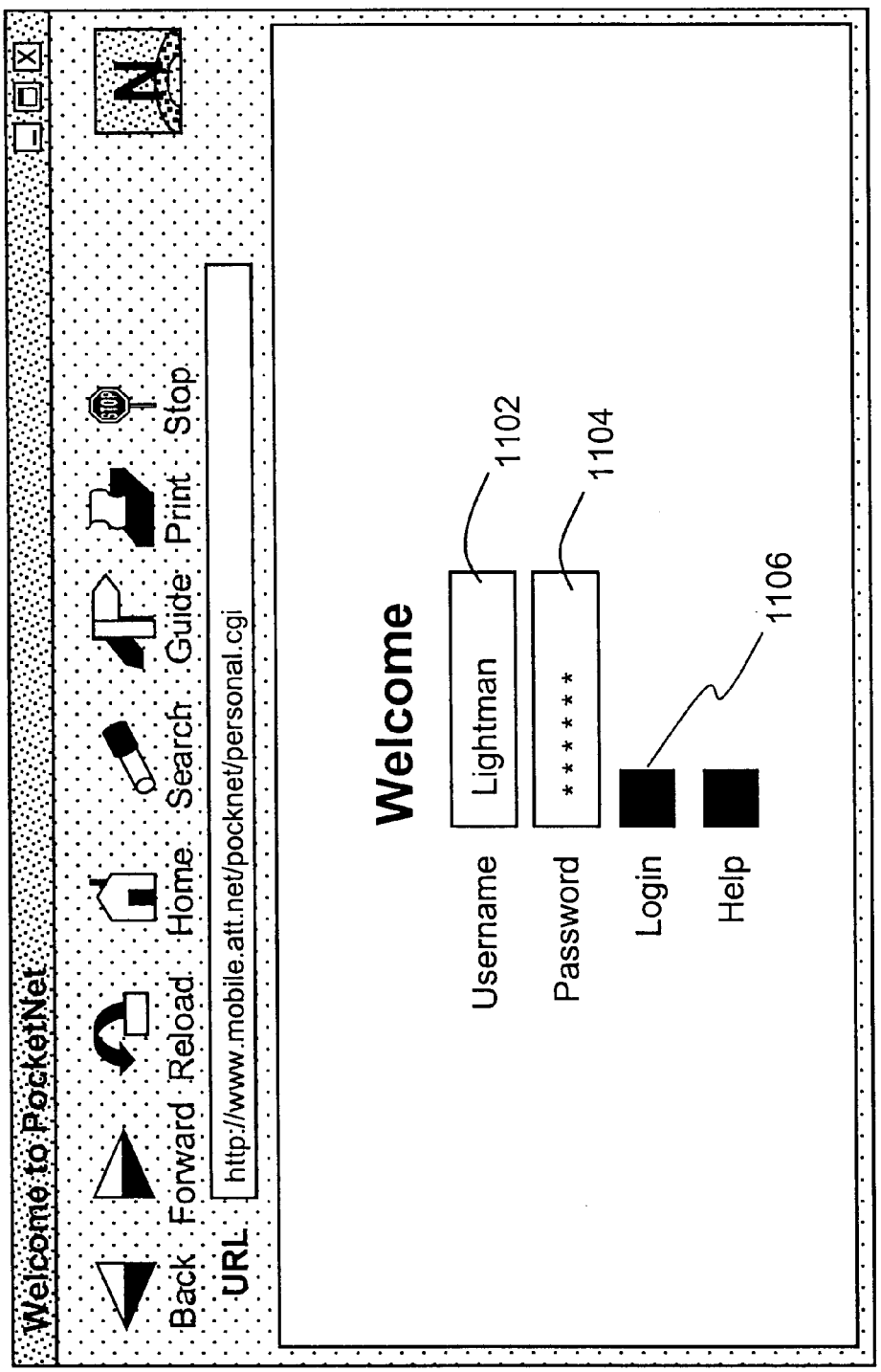
FIG. 11A illustrates an exemplary portal login page that can be displayed by a terminal device (client device) running a web browser.

FIG. 11A represents an exemplary login page according to one embodiment of the invention. In any case, once the decision 1004 determines that the login information has been received, then a decision 1006 determines whether the requestor has successfully logged into the portal server. Here, when the login information includes a user name and password, the username and password combinations are checked against a database to see if the requestor is authorized to access the portal server, in particular, a personal (private) portal provided by the portal server. When the decision 1006 determines that the login has not been successful, then a login failed response is sent 1008 to the requestor. Following the operation 1008, the private portal access processing 1000 is complete and ends with access to the private portal being denied.

On the other hand, when the decision 1006 determines that the login has been successful, then a personal portal page is sent 1010 to the requestor. A session also begins for the requester with respect to the portal server. Here, the personal portal page, or private portal page, is that particular portal page that the requestor is associated with. Typically, different requestors will be send different personal portal pages. Next, a decision 1012 determines whether a page request has been received. At this point, the requestor has gained access to the private portal and has received the personal portal page, and now requests a page from the personal portal page.

Figure 11B:
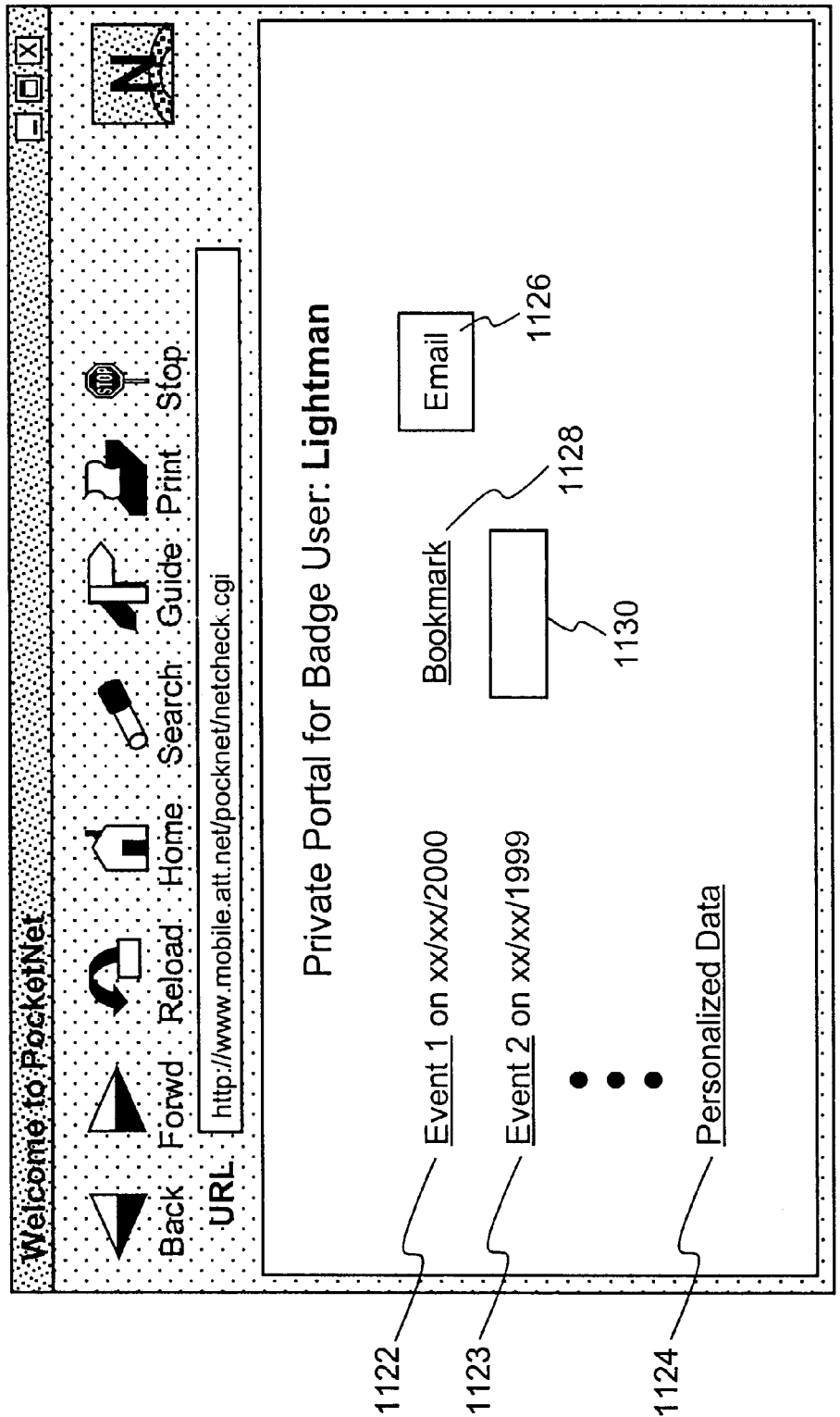
FIG. 11B illustrates an exemplary private portal page (or personal portal page).

FIG. 11B illustrates an exemplary private portal page for the requester. The private portal page typically includes a number of hyperlinks, or links, on the personal portal page that the requestor is able to select to obtain additional content or make other requests. Hence, the decision 1012 determines whether a page request has been received, such as by selecting one of the hyperlinks associated with the personal portal page. When the decision 1012 determines that a page request has been received, then the requested page is sent 1014 to the requestor. After the requested page is sent 1014, the private portal access processing 1000 returns to repeat the decision 1012 and subsequent blocks, so that additional page requests can be processed. Alternatively, when the decision 1012 determines that a page request has not been received, a decision 1016 determines whether the session should end. When the session is not to end, the session continues and the private portal access processing 1000 returns to repeat the decision 1012 and subsequent blocks. Alternatively, when the decision 1016 determines that the session should end, then the private portal access processing 1000 is complete and ends.

FIG. 11A illustrates an exemplary portal login page 1100 that can be displayed by a terminal device (client device) running a web browser. Examples of web browsers include Netscape Communicator™ and Microsoft Internet Explorer™. The portal login page 1100 is typically delivered first when a user of a wearable device wants to access his/her private portal from a terminal device (or personal computer). The user causes a request to be sent from the terminal device to a remote server that hosts the portal (e.g., portal server 114). A response from the remote server may be the portal login page 1100 that demands certain credential data from the user. Here, the demanded credential data from the user includes a user name 1102 and a password 1104. Once the user enters the user name 1102 and the password 1104 and then selects a login button 1106, a login request is transmitted to the remote server. If the remote server approves the user's access to the portal, then the user is provided with a private portal page 1120 (or personal portal page) such as shown in FIG. 11B. The private portal page 1120 is a representative page that can be presented to the user using the web browser running on the terminal device. The private portal page 1120 includes content or hyperlinks to other pages. In this representative page, there are links to various other pages representing content, services or databases. Namely, the private portal page 1120 includes an "Event 1" link 1122, an "Event 2" link 1123, a "Personalized Data" link 1124, an Email application link 1126, a Bookmark link 1128, and others 1130.

By selecting the Personalization Data link 1124, the user is presented with a page that specifies previously entered personal information (or profile information) for the user and allows alteration or editing thereof, or if not yet entered, that allows entry of such personal information. Once entered, this personal information can be exchanged with other devices as noted above. Also, after entry or alteration, the personal information can be can be downloaded into the wearable device associated with the user.

By selecting the Event 1 link 1122 or the Event 2 link 1123, the user is presented with a page that contains content associated with the respective link. Such content was typically previously uploaded from the wearable device associated with the user to the appropriate event or category. For example, if Event 1 is an event that the user previously attended, then the content can include various information that was exchanged (received) during the event. Hence, the private portal page 1120 serves to provide the user with access to such information in an organized manner from any terminal device having access to the data network (e.g., Internet). The portal thus allows users to view their interactions with others and facilitate subsequent contact of people and vendors they have met. In addition to the applications or services specifically provided with respect to uses with the wearable devices, there may be other applications or services available in the portal. By selecting the Email link 1126, an email application can be initiated. By selecting the Bookmark link 1128, a bookmark application or service can be initiated.

Although not shown in FIG. 11B, the portal can also provide advertising or affiliate information on the various pages (web pages) that are presented to the users. Such advertising can be targeted to the users in accordance with their profile information or their interests as determined from their wearable device. For example, the wearable device can gather data on the users interest from what booths or people they interact with during an event (e.g., trade show).

The personal portals and the data exchange between wearable devices can be advantageously used in various different environments. The wearable devices can assist their users or others in many ways.

The invention is preferably implemented in software, but can be implemented in hardware or a combination of hardware and software. The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices, carrier waves. The computer readable medium can also be distributed over a network coupled computer systems so that the computer readable code is stored and executed in a distributed fashion.

The advantages of the invention are numerous. Different embodiments or implementations may yield one or more of the following advantages. One advantage of the invention is that wearable devices can easily acquire from or transmit data to other wearable devices or terminal devices. Another advantage of the invention is that private portals can be provided for users of wearable devices to facilitate retrieval of information previously acquired by the wearable devices and transmitted to the private portals. Still another advantage of the invention is that the wearable devices can take many different configurations, forms, shapes or designs but are generally wearable and light weight.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for transferring data from a wearable device to a portal server via a server agent, said method comprising:
   (a) determining when the data should be uploaded from the wearable device to the portal server via the server agent;
   (b) determining whether the wearable device has permission to access a personal portion of the portal server; and
   (c) transmitting data from the wearable device to the server agent with instructions for the server agent to forward the data to the personal portion of the portal server when said determining (a) determines that the data should be uploaded and said determining (b) determines that the wearable device has permission to access the personal portion of the portal server, wherein the server agent is provided at a kiosk or booth at a fashion show, and said transmitting (c) is performed when the wearable device is located proximate to the kiosk or booth.

2. A method as recited in claim 1, wherein said determining (b) comprises:
   (b1) sending authentication information from the wearable device to the portal server via the server agent; and
   (b2) receiving an authentication accepted response that indicates that the wearable device is permitted to access at least the personal portion of the portal server.

3. A method as recited in claim 1, wherein said method further comprises:
   (d) providing an indication at the wearable device that the data transmission has been successfully completed.

4. A method as recited in claim 1, wherein the wearable device is an electronic badge.

5. A method as recited in claim 1, wherein the data being transmitted from the wearable device pertains to user profile information of a user of another wearable device that was transferred to and stored in the wearable device.

6. A method as recited in claim 5, wherein the user profile information includes name, business and contact information.

7. A method as recited in claim 6, wherein the user profile information further includes information on how long the users of at least one of the wearable device and the another wearable device interacted.

8. A method as recited in claim 7, wherein the interaction is conversation between the users.

9. A method as recited in claim 5, wherein the wearable device is an electronic badge.

10. A method as recited in claim 9, wherein said method further comprises:
    (d) providing an indication at the wearable device that the data transmission has been successfully completed.

11. A method as recited in claim 1,
    wherein determining (a) comprises determining whether the wearable device is in communication with the server agent, and
    wherein transmitting (c) transmits the data from the wearable device to the server agent only when said determining (a1) determines that the wearable device is in communication with the server agent.

12. A computer readable medium including computer program code for transferring data from a wearable device to a portal server via a server agent, said computer readable medium comprising:
    first computer program code for determining when the data should be uploaded from the wearable device to the portal server via the server agent;
    second computer program code for determining whether the wearable device has permission to access a personal portion of the portal server; and
    computer program code for transmitting data from the wearable device to the server agent with instructions for the server agent to forward the data to the personal portion of the portal server when said first computer program code for determining determines that the data should be uploaded and said second computer program code for determining determines that the wearable device has permission to access the personal portion of the portal server,
    wherein the server agent is provided at a kiosk or booth, and said transmitting (c) is performed when the wearable device is located proximate to the kiosk or booth.

13. A computer readable medium including computer program code for providing personal portals for users of wireless devices, the personal portals being hosted by a portal server, said computer readable medium comprising:

computer program code for receiving data uploaded from one of the wireless devices to an associated one of the personal portals for the user of the one of the wireless devices;

computer program code for processing the uploaded data to produce processed data; and computer program code for rendering the processed data available from the associated one of the personal portals, wherein the user has previously attended a fashion show or conference and has used the one of the wireless devices to acquire the data at the fashion show or conference.

14. A computer readable medium as recited in claim 13, wherein said computer program code for processing operates to form condensed data from the uploaded data.

15. A computer readable medium as recited in claim 13, wherein the uploaded data pertains to an event that the user of the one of the wireless devices attended.

16. A computer readable medium as recited in claim 15, wherein said computer program code for processing produces a list or report of contacts obtained from the event.

17. A computer readable medium as recited in claim 16, wherein said computer program code for rendering allows the user of the one of the wireless devices to access the list or report via the associated one of the personal portals.

18. A computer readable medium as recited in claim 13, wherein said computer program code for processing stores the uploaded data in a database having a predetermined layout.

19. A computer readable medium as recited in claim 13, wherein access to the personal portals is permitted only after a user of one of the requesting wireless devices has been authenticated.

20. A computer readable medium as recited in claim 13, wherein said computer readable medium further comprises:

computer program code for receiving an access request to a particular personal portal from a requesting user;

computer program code for determining whether the requesting user can be authenticated; and computer program code for permitting the requesting user to access the particular personal portal when said computer program code for determining has determined that the requesting user has been authenticated.

21. A computer readable medium as recited in claim 20, wherein the particular portal includes private portal pages that the requesting user can retrieve from the portal server.

22. A computer readable medium as recited in claim 20, wherein the wireless devices are electronic badges or charms.

23. A computer readable medium as recited in claim 13, wherein the wireless devices are electronic badges or charms.

24. A computer readable medium as recited in claim 13, wherein the wireless devices are wearable computing devices.

25. A computer readable medium, including computer program code for providing personal portals for users of wireless devices, the personal portals being hosted by a portal server, said computer readable medium comprising:

computer program code for receiving data uploaded from one of the wireless devices to an associated one of the personal portals for the user of the one of the wireless devices:

computer program code for processing the uploaded data to produce processed data; and computer program code for rendering the processed data available from the associated one of the personal portals, wherein the user has previously attended a fashion show and has used the one of the wireless devices to acquire the data at the fashion show, wherein the wireless devices are wearable computing devices, and wherein access to the personal portals is permitted only after a user of one of the requesting wireless devices has been authenticated.

26. A computer readable medium as recited in claim 25, wherein said computer readable medium further comprises:

computer program code for receiving an access request to a particular personal portal from a requesting user;

computer program code for determining whether the requesting user can be authenticated; and computer program code for permitting the requesting user to access the particular personal portal when said computer program code for determining has determined that the requesting user has been authenticated.

27. A computer readable medium as recited in claim 26, wherein the particular portal includes private portal pages that the requesting user can retrieve from the portal server.

\* \* \* \* \*